United States Patent [19]

Konieczynski

[11] Patent Number: 5,016,665

[45] Date of Patent: May 21, 1991

[54] METHOD AND APPARATUS OF ISOLATING PNEUMATIC PANELS IN LIQUID APPLICATION SYSTEMS

[75] Inventor: Ronald D. Konieczynski, North Royalton, Ohio

[73] Assignee: Nordson Corporation, Westlake, Ohio

[21] Appl. No.: 489,519

[22] Filed: Mar. 7, 1990

[51] Int. Cl.[5] .............................................. G05D 16/18

[52] U.S. Cl. .......................................... 137/1; 137/14; 137/489.5; 137/495; 137/551

[58] Field of Search ................ 137/505.14, 489.5, 495, 137/486, 1, 12, 14, 551, 559; 251/33, 34, 41, 30.01

[56] References Cited

U.S. PATENT DOCUMENTS

| | | | |
|---|---|---|---|
| 2,202,286 | 5/1940 | Gorrie | 137/14 |
| 2,389,413 | 11/1945 | Carlton . | |
| 2,574,414 | 11/1951 | Ragland | 137/906 |
| 2,637,946 | 5/1953 | Parks | 137/489.5 |
| 2,746,471 | 5/1956 | Cobb | 137/495 X |
| 3,026,045 | 3/1962 | Reading . | |
| 3,385,522 | 5/1968 | Kock . | |
| 3,714,953 | 2/1973 | Solvang | 137/906 X |
| 4,346,732 | 8/1982 | Moos | 137/489 |
| 4,694,848 | 9/1987 | Jorgensen et al. | 251/335.2 X |
| 4,797,098 | 1/1989 | Kawata | 137/614.2 X |
| 4,809,746 | 3/1989 | Wöfges | 251/30.01 X |

OTHER PUBLICATIONS

"Binks Model 84-531 Remote Fluid Pressure Regulator Parts List" (1 page), (no date).

*Primary Examiner*—Stephen M. Hepperle
*Attorney, Agent, or Firm*—Wood, Herron & Evans

[57] ABSTRACT

A method and apparatus for applying liquid coating materials, adhesives or other liquids is provided in which the liquid material is pumped from a source through a pneumatically operated, diaphragm-type pressure regulator which discharges the liquid at a controlled pressure to a dispenser such as a spray gun. Pressurized air from a pneumatic panel or other air supply device is transmitted to one side of the diaphragm in the pressure regulator through a one-way valve such as a check valve which protects the pneumatic panel from an upstream flow of liquid from the pressure regulator in the event of a failure of its diaphragm. A fluid bleed device such as a choke is located downstream from the check valve and upstream from the diaphragm in the pressure regulator to vent pressurized air located therebetween, and to permit the escape of at least some of the liquid flowing upstream from the pressure regulator in the event of a failure of its diaphragm which provides a visual indication of the failure of the diaphragm.

14 Claims, 1 Drawing Sheet

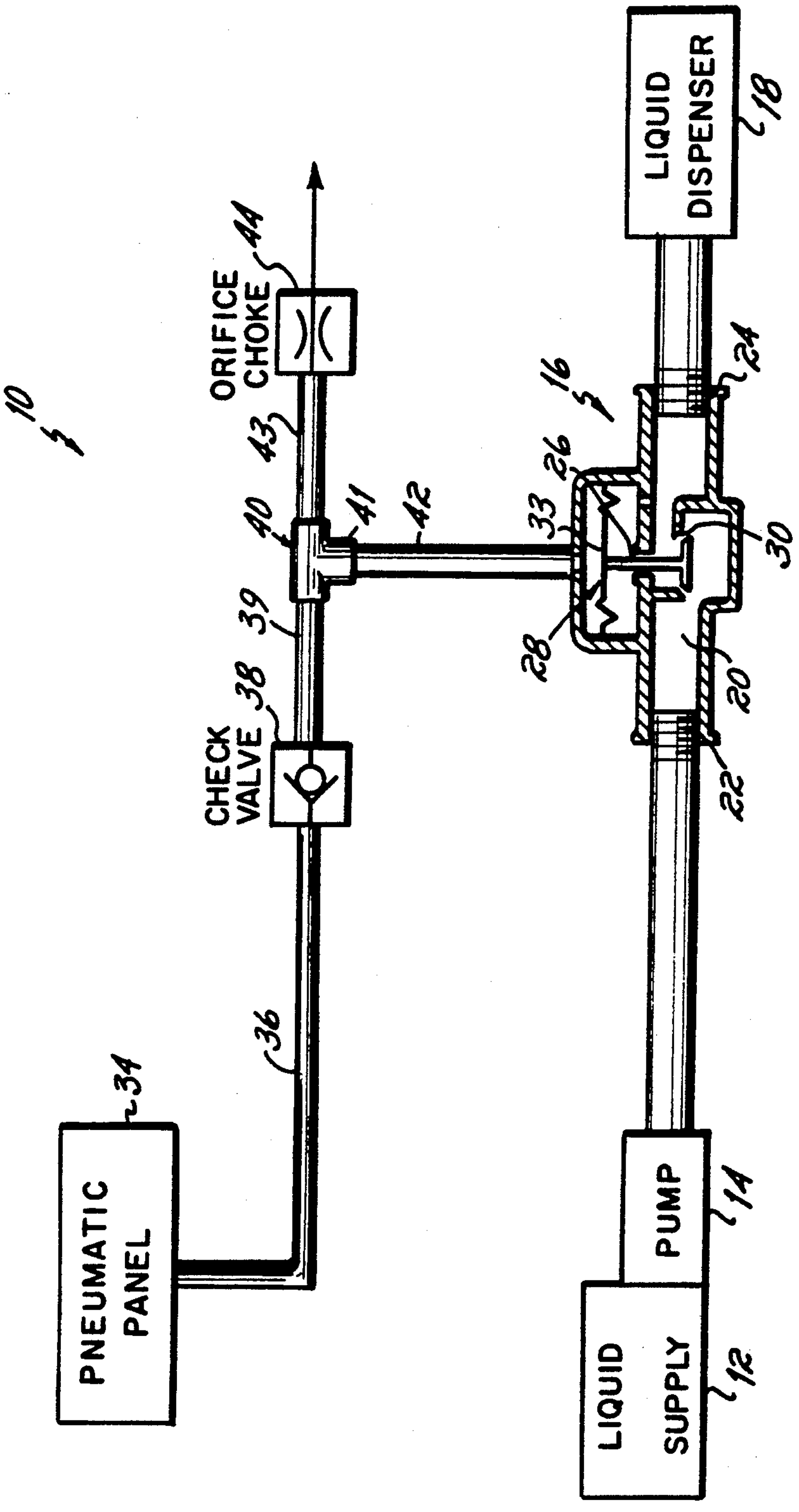
LIQUID DISPENSER
18
ORIFICE CHOKE
44
10
16
24
43
26
40
41
42
33
30
39
28
20
CHECK VALVE
38
22
36
PNEUMATIC PANEL
34
PUMP
14
LIQUID SUPPLY
12

METHOD AND APPARATUS OF ISOLATING PNEUMATIC PANELS IN LIQUID APPLICATION SYSTEMS

FIELD OF THE INVENTION

This invention relates to liquid application systems of the type which employ a source of pressurized air such as a pneumatic panel to control the operation of pressure regulators associated with liquid dispensing devices, and, more particularly, to a method and apparatus of protecting the pneumatic panel from a back flow of liquid in the event of a failure of the pressure regulators.

BACKGROUND OF THE INVENTION

Systems for the application of liquid coating materials, adhesives and the like include liquid dispensing devices such as spray guns which are supplied with liquid from a pump operatively connected to a tank or other source of the liquid. In order to control the pressure at which the liquid is supplied to the spray guns, pressure regulators are commonly interposed between the pump and spray guns.

One type of pressure regulator used in applications of this type includes a regulator body formed with a liquid passageway having an inlet which receives liquid from the pump and outlet which discharges the liquid to at least one spray gun. A poppet valve or similar flow control device is carried by a thin, flexible diaphragm within the regulator body. In response to flexing of the diaphragm, the poppet valve is movable relative to a valve seat located within the liquid passageway to control the pressure at which the liquid is discharged from the outlet of the passageway to the spray gun. Many pressure regulators of this type are pneumatically operated, i.e., a pneumatic panel or other air supply device transmits operating air to the side of the diaphragm opposite the liquid passageway to flex the diaphragm and thereby adjust the poppet valve to the desired position relative to the valve seat within the liquid passageway. The thin, flexible diaphragm is highly responsive to the flow of operating air from the pneumatic panel, and thus good control of the pressure of the liquid discharged from the pressure regulator can be obtained.

One problem with pneumatically operated, diaphragm-type pressure regulators is the damage to the pneumatic panel or other air supply device which can be created in the event of a failure of the diaphragm. Because the liquid flowing through the passageway in the pressure regulator is located on the side of the diaphragm opposite the operating air, a rupture or leak in the diaphragm can result in the flow of liquid past the diaphragm and then upstream from the pressure regulator into the pneumatic panel. The pneumatic panels are expensive units and can be severely damaged by the back flow of liquid therein.

One proposed solution to this problem has been to incorporate redundant or additional diaphragms within the pressure regulator so that in the event of the failure of one diaphragm, a second or third diaphragm is available to block the escape of liquid upstream to the pneumatic panel. But pressure regulators employing two or more diaphragms are relatively expensive and complicated. In addition, such pressure regulators provide no means to indicate if a rupture, leak or other failure of the diaphragm(s) has occurred.

SUMMARY OF THE INVENTION

It is therefore among the objectives of this invention to provide a method and apparatus for the protection of the pneumatic panel in systems for applying coating materials, adhesives and other liquids in which liquid is prevented from flowing upstream to the pneumatic panel in the event of a failure of the diaphragm in the pressure regulator associated with the liquid application system, and in which a visual indication of a failure of the diaphragm is provided.

These objectives are accomplished in a method and apparatus for applying liquid coating materials, adhesives or other liquids in which the liquid material is pumped from a source through a pneumatically operated, diaphragm-type pressure regulator which discharges the liquid at a controlled pressure to a dispenser such as a spray gun. Operating air from a pneumatic panel or other air supply device is transmitted to one side of the diaphragm in the pressure regulator through a one-way valve such as a check valve. A fluid bleed device such as a choke is located in the system downstream from the check valve and upstream from the diaphragm in the pressure regulator.

In the normal operation of the liquid application system herein, pressurized air discharged from the pneumatic panel unseats the check valve and flows to one side of the diaphragm in the pressure regulator. The diaphragm is connected to a poppet valve or other flow control device which is movable relative to a valve seat located in the liquid passageway of the pressure regulator. The diaphragm flexes in response to the application of operating air thereto to move the poppet valve relative to the valve seat and thus control the pressure at which liquid flowing through the liquid passageway in the pressure regulator is discharged to the spray gun.

The check valve is effective to prevent the back flow of liquid into the pneumatic panel from the pressure regulator in the event of failure of the diaphragm therein, but the check valve also prevents operating air from escaping out of the pressure regulator. Operating air must be vented from between the check valve and diaphragm in order to accommodate flexing of the diaphragm during operation of the system, and to allow the diaphragm to return to an unflexed position when the flow of air from the pneumatic panel ceases and the check valve closes. One important function of the fluid bleed device or choke of this invention is to vent operating air from between the check valve and diaphragm and thus permit the diaphragm to freely flex under normal operating conditions.

The fluid bleed device or choke of this invention also provides an important function in indicating when a failure of the diaphragm in the pressure regulator has occurred. In the event the diaphragm ruptures or begins to leak, flow of liquid from the passageway in the pressure regulator can move upstream past the diaphragm toward the check valve and pneumatic panel. As described above, the check valve is effective to prevent the flow of liquid to the pneumatic panel but, without the fluid bleed device or choke, the system operator would have no indication of a problem with the diaphragm. Instead, at least some of the liquid which flows upstream from the failed diaphragm is permitted to escape through the choke and the presence of this liquid is readily visible to the operator so that steps can immediately be taken to repair or replace the damaged diaphragm in the pressure regulator.

This invention is therefore predicated upon the concept of incorporating a one-way valve and a fluid bleed device such as a choke in between the pneumatic panel and pressure regulator to provide a reliable means of preventing the passage of liquid upstream from the pressure regulator in the event of a failure of its diaphragm without interfering with normal operation of the system, and to provide a visual indication of the failure of the diaphragm. Redundant diaphragms or other expensive and complicated designs to protect the pneumatic panel are not necessary with the invention herein and this provides a substantial savings in cost.

DESCRIPTION OF THE DRAWINGS

The structure, operation and advantages of the presently preferred embodiment of this invention will become further apparent upon consideration of the FIGURE which is a schematic view of a system employing the check valve and bleed device or choke of this invention.

DETAILED DESCRIPTION OF THE INVENTION

Referring now to the FIGURE, the system 10 of this invention comprises a liquid supply 12 connected to a pump 14 which pumps the liquid through a pressure regulator 16 to a liquid dispenser 18 such as a spray gun. The pressure regulator 16 is a pneumatically operated, diaphragm-type pressure regulator 16, which is depicted schematically in the FIGURE for purposes of illustration. The pressure regulator 16 includes a liquid passageway 20 having an inlet 22 which receives liquid from the pump 14, and an outlet 24 which discharges the liquid to dispenser 18. A poppet valve 26 is carried within the pressure regulator 16 by a thin, flexible diaphragm 28 so that the base of the poppet valve 26 is located within a valve seat 30 mounted in the liquid passageway 20. The base of the poppet valve 26 is axially movable with respect to the valve seat 30 in response to flexion of the diaphragm 28, so as to vary the spacing between the poppet valve 26 and the valve seat 28. Variation of this spacing, in turn, controls the pressure at which liquid is discharged from the outlet 24 of liquid passageway 20 to the dispenser 18.

Flexion or movement of the diaphragm 28 is controlled by pressurized operating air supplied from an air supply device such as a pneumatic panel 34 to the outer side 33 of the diaphragm. The panel 34 is connected by a line 36 to a one-way valve such as a commercially available check valve 38. The check valve 38, in turn, is connected by a line 39 to one side of a T-fitting 40. The stem 41 of T-fitting 40 is connected by a line 42 to the pressure regulator 16 at the outer side 33 of the flexible diaphragm 28. The opposite side of T-fitting 40 is connected by a line 43 to a fluid bleed device such as an orifice choke 44 having an outlet to atmosphere. One type of choke 44 which is suitable for use herein is commercially available from the Clippard Company under the Part No. MAC-B.

The system 10 of this invention operates as follows. The pump 14 introduces liquid into the liquid passageway 20 of pressure regulator 16 at essentially constant pressure and flow rate. In order to obtain the desired pressure of the liquid discharged to the dispenser 18, the pneumatic panel 34 supplies operating air through the check valve 38, line 39, T-fitting 40 and line 42 to the outer side 33 of the diaphragm 28 within pressure regulator 16. This operating air is effective to flex the diaphragm 28 such that the base of poppet valve 26 is axially moved relative to the valve seat 30 within the liquid passageway 20, to thus control the pressure at which the liquid is discharged from the outlet 24 of liquid passageway 20 to the dispenser 18.

The purpose of the check valve 38 is to prevent the flow of liquid from the pressure regulator 16 upstream to the pneumatic panel 34. The check valve 38 is oriented in the lines 36 and 39 to open in response to the supply of pressurized operating air downstream from the pneumatic panel 34, and to close in the event of a flow of liquid in an upstream direction through the line 42, T-fitting 40 and line 39. Such upstream flow of liquid could occur if the diaphragm 28 of pressure regulator 16 ruptured, leaked or otherwise failed, thus diverting liquid flowing through passageway 20 upstream from the pressure regulator 16 toward the check valve 38 and pneumatic panel 34.

An important aspect of this invention is the provision of the fluid bleed device or choke 44 in a position downstream with respect to the check valve 38 and upstream from the pressure regulator 16 and its diaphragm 28. The fluid bleed device or choke 44 performs two important functions in the system 10 of this invention. First, the choke 44 provides a means to vent operating air from between the diaphragm 28 of pressure regulator 16 and the check valve 38. While the check valve 38 is effective to prevent the flow of liquid upstream from the pressure regulator 16 in the event of a failure of its diaphragm 28, the check valve 38 also prevents the escape of operating air from the outer side 33 of the diaphragm 28 within pressure regulator 16. The thin, flexible diaphragm 28 must be permitted to deflect freely within the pressure regulator 16 and such motion can be restricted by the buildup of operating air in the line 42, T-fitting 40 and line 39 between the diaphragm 28 and check valve 38. The choke 44 avoids this problem by permitting at least some venting of operating air from between the diaphragm 28 and check valve 38 so as to permit the diaphragm 28 to freely flex at all times during normal operation of the system 10.

The second advantage obtained with the fluid bleed device or choke 44 of this invention is the provision of a visual indication or warning of the failure of the diaphragm 28. In the event the diaphragm 28 ruptures or leaks and allows liquid to escape from the passageway 20 in pressure regulator 16 upstream toward the check valve 38, at least some of the liquid is permitted to pass through line 43 to the fluid bleed device or choke 44. This liquid passes outwardly through the choke 44 and can be readily visually detected by the system operator. An immediate visual indication of a problem with the pressure regulator 16 is thus provided, allowing the operator to cease operation of the system 10 and repair or replace the diaphragm 28.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, one type of basic air-operated pressure regulator 16 is depicted in the FIGURE for purposes of illustrating the operation of this invention. It is contemplated that pressure regulators of other designs could be utilized.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for dispensing a liquid material, comprising:

a liquid dispenser;

liquid supply means for supplying liquid to said liquid dispenser;

a pneumatically operated, diaphragm-type pressure regulator connected between said liquid supply means and said liquid dispenser which controls the pressure at which the liquid is supplied to said liquid dispenser;

air supply means for supplying pressurized air to the diaphragm of said pressure regulator;

a one-way valve located between said air supply means and said pressure regulator, said one-way valve being movable between an open position in which pressurized air from said air supply means is permitted to flow downstream to said pressure regulator, and a closed position in which liquid from said pressure regulator is prevented from flowing upstream to said air supply means in the event of a failure of said diaphragm of said pressure regulator;

failure warning means for discharging at least a portion of the liquid escaping through said pressure regulator in the event of a failure of said diaphragm thereof, whereby the discharge of liquid through said failure warning means provides a visual indication of a failure of said diaphragm of said pressure regulator.

2. The apparatus of claim in which said failure warning means comprises a choke having an outlet which discharges liquid escaping upstream from said pressure regulator in the event of a failure of said diaphragm of said pressure regulator so that the escaping liquid can be readily visually detected.

3. Apparatus for dispensing a liquid material, comprising:

a liquid dispenser;

liquid supply means for supplying liquid to said liquid dispenser;

a pneumatically operated pressure regulator connected between said liquid supply means and said liquid dispenser, said pressure regulator being formed with a liquid passageway having an inlet for receiving liquid from the said liquid supply means and an outlet for discharging the liquid to said liquid dispenser, said pressure regulator having a flexible diaphragm connected to a flow control device carried within said liquid passageway;

air supply means for supplying operating air to one side of said diaphragm in said pressure regulator, said operating air inducing flexing movement of said diaphragm and thereby varying the location of said flow control device relative to said liquid passageway to control the pressure at which the liquid is discharged into said liquid dispenser;

a one-way valve located between said air supply means and said pressure regulator, said one-way valve being oriented to permit the flow of operating air in a downstream direction from said air supply means to said diaphragm of said pressure regulator;

venting and failure warning means for venting operating air located between said one-way valve and said diaphragm of said pressure regulator, and for providing an escape path for at least a portion of the liquid flowing upstream from said liquid passageway in said pressure regulator toward said one-way valve and air supply means in the event of a failure of said diaphragm in said pressure regulator.

4. The apparatus of claim 3 in which said venting and failure warning means comprises a fluid bleed device open to atmosphere which is operable to vent operating air located between said pressure regulator and said one-way valve.

5. The apparatus of claim 3 in which said venting and failure warning means comprises a fluid bleed device open to atmosphere which is effective to permit the escape of at least some of the liquid flowing upstream toward said one-way valve and air supply means in the event of a failure of said diaphragm, the liquid escaping through said fluid bleed device providing a visual indication of the failure of said diaphragm.

6. A system for the detection of a failure in the diaphragm of an air-operated, liquid pressure regulator, comprising:

a one-way valve adapted to be connected between a source of operating air and the pressure regulator, said one-way valve being movable between an open position in which pressurized air from the source of operating air is permitted to flow downstream to the pressure regulator, and a closed position in which liquid from the pressure regulator is prevented from flowing upstream to the source of operating air in the event of a failure of the diaphragm of the pressure regulator;

fluid bleed means for discharging at least a portion of the liquid flowing upstream from the pressure regulator to provide a warning of the failure of the diaphragm of the pressure regulator.

7. The system of claim 6 in which said fluid bleed means is a choke having an outlet open to atmosphere through which liquid from the pressure regulator can escape and be visually detected.

8. A system for the protection of an air supply device which supplies pressurized air to an air-operated, diaphragm-type liquid pressure regulator associated with a dispenser in a liquid application system, comprising:

a one-way valve adapted to be connected between the air supply device and the pressure regulator, said one-way valve being movable between an open position in which pressurized air from the air supply device is permitted to flow downstream to the flexible diaphragm of the pressure regulator, and a closed position in which liquid from the pressure regulator is prevented from flowing upstream into the air supply device in the event of a failure of the flexible diaphragm of the pressure regulator;

vent means for venting operating air located between said one-way valve and pressure regulator to permit the diaphragm of the pressure regulator to freely flex during operation.

9. The system of claim 8 in which said vent means is a choke having an outlet open to atmosphere.

10. The method of supplying liquid material to a dispenser, comprising:

supplying liquid material from a source to a pneumatically operated pressure regulator connected to a liquid dispenser;

supplying pressurized air from an air supply device through a one-way valve to the pressure regulator to control the pressure at which the liquid is discharged from the pressure regulator into the liquid dispenser;

discharging liquid through a failure detection device in the event of a failure of the pressure regulator so that a visual warning is provided indicating failure of the pressure regulator.

11. The method of detecting failure of the diaphragm in an air-operated, liquid pressure regulator employed in a system for applying liquid material, comprising:

supplying liquid material from a source to a pneumatically operated pressure regulator connected to a liquid dispenser;

supplying pressurized air from an air supply device through a one-way valve to the diaphragm of the pressure regulator for the control of the pressure at which liquid is discharged from the pressure regulator into the liquid dispenser;

discharging liquid through a failure detection device in the event of a failure of the diaphragm of the pressure regulator so that a visual warning is provided indicating failure of the diaphragm.

12. The method of claim 11 in which said step of discharging liquid comprises directing at least a portion of the liquid escaping through the diaphragm in the event of a failure thereof upstream through the failure detection device which is located in between the one-way valve and the pressure regulator.

13. The method of supplying liquid material to a dispenser, comprising:

supplying liquid material from a source to a pneumatically operated pressure regulator connected to a liquid dispenser;

supplying pressurized air from an air supply device through a one-way valve to the pressure regulator to control the pressure at which the liquid is discharged from the pressure regulator into the liquid dispenser;

venting operating air located between the pressure regulator and the one-way valve to prevent a buildup of pressurized air therebetween during operation of the pressure regulator.

14. The method of protecting an air supply device in a system for applying liquid material, comprising:

supplying liquid material from a source to a pneumatically operated pressure regulator connected to a liquid dispenser;

opening a one-way valve located between the air supply device and a pressure regulator to permit the flow of pressurized air downstream from the air supply device to the pressure regulator so as to control the pressure at which liquid is discharged from the pressure regulator into the liquid dispenser;

closing the one-way valve in the event of a failure of the pressure regulator to block the flow of liquid upstream from the pressure regulator into the air supply device;

venting operating air located between the pressure regulator and the one-way valve to prevent a buildup of pressurized air therebetween during operation of the pressure regulator.

* * * * *